United States Patent
Yang et al.

(10) Patent No.: US 7,672,253 B2
(45) Date of Patent: Mar. 2, 2010

(54) BORDER ROUTER WITH SELECTIVE FILTERING OF LINK STATE ADVERTISEMENTS

(75) Inventors: Yi Yang, Morrisville, NC (US); Russell Ivan White, Holly Springs, NC (US); Alvaro E. Retana, Raleigh, NC (US); Abhay Kumar Roy, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 330 days.

(21) Appl. No.: 11/834,445

(22) Filed: Aug. 6, 2007

(65) Prior Publication Data

US 2009/0041037 A1    Feb. 12, 2009

(51) Int. Cl.
*H04L 12/16* (2006.01)
*H04L 12/28* (2006.01)
(52) U.S. Cl. .................................. 370/255; 370/401
(58) Field of Classification Search .................. 370/254, 370/255, 351, 389, 392, 401
See application file for complete search history.

(56) References Cited

U.S. PATENT DOCUMENTS

| | | | |
|---|---|---|---|
| 6,473,421 B1 | 10/2002 | Tappan | |
| 7,200,122 B2 * | 4/2007 | Goringe et al. | 370/255 |
| 7,483,387 B2 * | 1/2009 | Guichard et al. | 370/252 |
| 2003/0014540 A1 * | 1/2003 | Sultan et al. | 709/240 |
| 2006/0262735 A1 * | 11/2006 | Guichard et al. | 370/254 |
| 2007/0019647 A1 | 1/2007 | Roy et al. | |
| 2007/0047447 A1 | 3/2007 | Mirtorabi et al. | |
| 2007/0127395 A1 * | 6/2007 | Jain et al. | 370/254 |
| 2007/0127396 A1 * | 6/2007 | Jain et al. | 370/254 |
| 2007/0260746 A1 * | 11/2007 | Mirtorabi et al. | 709/238 |
| 2008/0056157 A1 * | 3/2008 | Retana et al. | 370/254 |

FOREIGN PATENT DOCUMENTS

EP    1 185 041 A2    3/2002

OTHER PUBLICATIONS

Cisco Document ID No. 13703, "What Are OSPF Areas and Virtual Links?", Aug. 10, 2005.
Martix X Router Configuration Guide, Chapter 16 "Layer 3 OSPF Configuration," Aug. 26, 2007.

(Continued)

*Primary Examiner*—Hong Cho
(74) *Attorney, Agent, or Firm*—Baker Botts L.L.P.

(57) ABSTRACT

An example embodiment of the present invention provides a process relating to the selective filtering of an LSA at a not-so-stubby-sub-area (NSSSA) border router. In one embodiment, the border router receives an LSA from another router inside the NSSSA, which might be in the access layer of the hierarchical network design model and which might use OSPF as its IGP. If the LSA is Type 1 and includes a subnet route or forwarder address, the border router floods it to its neighboring routers, regardless of whether they are inside the NSSSA. If the LSA is Type 7 and includes a host address, the border router floods it to a neighboring router if the neighboring router is inside the NSSSA, but filters the LSA if the neighboring router is outside the NSSSA, for example, in an OSPF area in the distribution layer of the hierarchical network design model.

20 Claims, 5 Drawing Sheets

OTHER PUBLICATIONS

Hewlett Packard Company, "Installing and Administering Internet Services" HP 9000 Networking, Edition 8, 2000.

Pun, Hubert, "Convergence Behavior of RIP and OSPF Network Protocols", B.A.Sc, University of British Columbia 1998.

Cisco Documentation "Internetworking Design Basics", Posted: Sun Apr. 23 18:47:27 PDT 2006 All contents are Copyright © 1992-2006 Cisco Systems, Inc.

Cisco.com "Open Shortest Path First v3", OSPFv3, Feb. 2003, Cisco Systems, Inc.

Murphy, P., "The OSPF Not-So-Stubby Area (NSSA) Option", Network Working Group, Request For Comments No. 3101, Jan. 2003.

* cited by examiner

BORDER ROUTER WITH SELECTIVE FILTERING OF LINK STATE ADVERTISEMENTS

TECHNICAL FIELD

The present disclosure relates to interior gateway protocols (IPGs) for network routing and the computing devices, such as routers, that implement them.

BACKGROUND

The Open Shortest Path First (OSPF) protocol is an interior gateway protocol designed to distribute routing information between routers in a single autonomous system (AS). This protocol uses path cost as its routing metric, where path cost is determined generally by the speed (e.g., bandwidth) of the interface addressing a given route and where Dijkstra's algorithm is used to calculate the shortest path tree. A link state database (LSDB) is constructed as a tree structure of the network topology and identical copies of the LSDB are periodically updated on all routers in each area implementing the protocol.

OSPF routers exchange various types of link state advertisements (LSAs) to build their LSDBs. Most LSAs are flooded (sent to every router) throughout the attached area. An exception is the LSA sent out by AS boundary routers that describe routes to destinations outside the AS; these advertisements are flooded throughout the AS.

OSPF defines various types of routers. These are logical definitions though and a router that uses OSPF may be classified as more than one type. For example, consider a router that is connected to more than one area and that receives routes from a BGP (Border Gateway Protocol) process connected to another AS. As described below, such a router is both an area border router (ABR) and an autonomous system boundary router (ASBR).

An area border router (ABR) is a router that connects one or more OSPF areas to the backbone area. An ABR is considered a member of all areas to which it is connected and keeps multiple copies of LSDBs in memory, one for each area. An autonomous system boundary router (ASBR) is a router that is connected to more than one AS and that exchanges routing information with routers in other ASs. Typically, ASBRs also run a second routing protocol or routing protocol process, such as BGP. An ASBR is used to distribute routes received from other routing protocol processes throughout its own AS. A router is called an internal router (IR) if it has only OSPF adjacencies with routers in the same area.

DESCRIPTION OF EXAMPLE EMBODIMENT(S)

A. Overview

In particular embodiments, the present invention provides methods, apparatuses, and systems directed to the filtering of Type 7 LSAs at a router that is not an ABR or an ASBR, but a border router associated with a not-so-stubby-sub-area (NS-SSA). The following example embodiments are described and illustrated in conjunction with apparatuses, methods, and systems which are meant to be examples and illustrative, not limiting in scope.

A.1. Network Environment

Figure 1:
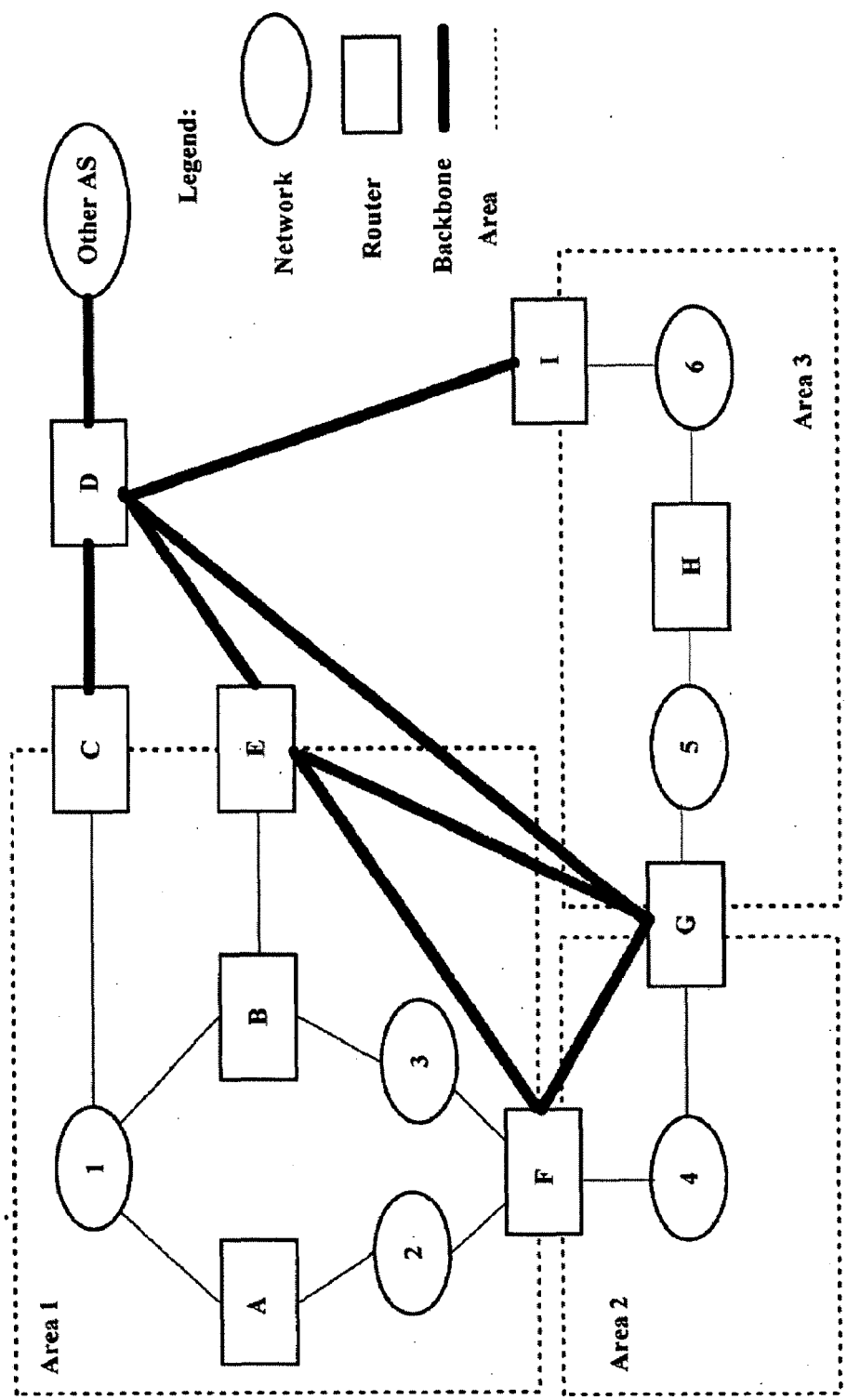
FIG. 1 is a diagram showing a network configuration for the OSPF protocol, which configuration might be used with some embodiments of the present invention.

FIG. 1 is a diagram showing a network configuration for the OSPF protocol, which configuration might be used with some embodiments of the present invention. As shown in the diagram, an AS includes a backbone (area 0) and three other areas which are connected to the backbone: areas 1, 2, and 3. Drilling down, the backbone includes six ABRs: C, D (which is also an ASBR), E, F, G, and I. Area 1 includes two internal routers, A and B, while Area 3 includes only one internal router, H. Area 2 has no internal routers.

An OSPF network is divided into areas. These are logical groupings of routers whose information may be summarized with respect to the rest of the network. Several special area types are defined as follows.

The backbone area (also known as area zero or 0) forms the core of an OSPF network, i.e., it is the logical and physical structure for an AS. According to the OSPF protocol specification, all other areas should be connected to the backbone area and the backbone area is responsible for distributing routing information between non-backbone areas. The backbone must be contiguous, but it does not need to be physically contiguous. That is to say, backbone connectivity can be established and maintained through the configuration of virtual links. By definition, all ABRs are part of the backbone, since those routers pass routing information between areas.

The other special areas can be described on the basis of their restrictions, if any, as to their flooded LSAs. The following table (from What are OSPF Areas and Virtual Links, Cisco Document ID 13703, Aug. 10, 2005) summarizes those restrictions:

| Area | Restriction |
| --- | --- |
| Normal | None |
| Stub | No Type 5 AS-external LSA allowed |
| Totally Stub | No Type 3, 4 or 5 LSAs allowed except the default summary route |
| NSSA | No Type 5 AS-external LSAs allowed, but Type 7 LSAs that convert to Type 5 at the NSSA ABR can traverse |
| NSSA Totally Stub | No Type 3, 4 or 5 LSAs except the default summary route, but Type 7 LSAs that convert to Type 5 at the NSSA ABR are allowed |

As can be seen from the table, a normal area has no restrictions.

A stub area is an area which does not receive AS-external routes, i.e., routes that are defined as routes which are distributed in OSPF from another routing protocol and that are advertised by Type 5 LSAs as defined in RFC 2328, Standard 54, promulgated by the Internet Engineering Task Force (IETF). Therefore, stub areas typically rely on a default route to send network traffic to routes outside their AS. A totally stubby area (TSA) is similar to a stub area, but does not allow summary routes (except for the default summary route) in addition to the external routes; that is to say, inter-area routes are not summarized into totally stubby areas.

A not-so-stubby area (NSSA) is a type of stub area which can import AS external routes and send them to the backbone, but cannot receive AS external routes from the backbone or from other areas. For the redistribution of link-state information into an NSSA, a special type of LSA, called a Type 7 (as defined in IETF's RFC 3101), is used. An NSSA ASBR generates Type 7 LSAs and an NSSA ABR router translates them into Type 5 LSAs for purposes of flooding. Cisco Systems, Inc. also implements a proprietary version of a NSSA called a NSSA totally stubby area. Such an area takes on the attributes of a TSA, meaning that Type 3 and Type 4 summary routes (except for the default summary route) are not flooded into this type of area.

A system has been developed that allows enterprises to replace layer-2 switching with layer-3 routing in the distribution and access layers while keeping the flexibility and ease of use of existing layer-2 technologies. In other words, layer-3 routing is pushed out to the edge or access layer of the network. In a particular implementation, a domain may include one or more layer-3 forwarders and one or more domain border routers. For example, the switches in the access layer of a network may be augmented to be layer-3 forwarders, while routers at the distribution and core layers can be domain border routers. The network configuration breaks association of a subnet to an interface (or access port of a switch) and associates a subnet to a domain. A domain can contain several subnets. Hosts can acquire an IP address that belongs to a domain and reside anywhere in the domain, and move from one place to another place in a domain without having to get a new IP address. Forwarders can use layer-3 routing protocols to discover the domain topology, and learn directly connected hosts and advertise these associations using a routing protocol. In some embodiments of this system, a "sub-domain" might consist of a set of "forwarders" (e.g., devices that buffer and forward data packets across an internetwork using a routing protocol) that share policies and one or more subnets. A "domain" might consist of one or more sub-domains, with subnet routes being summarized between them.

Figure 5:
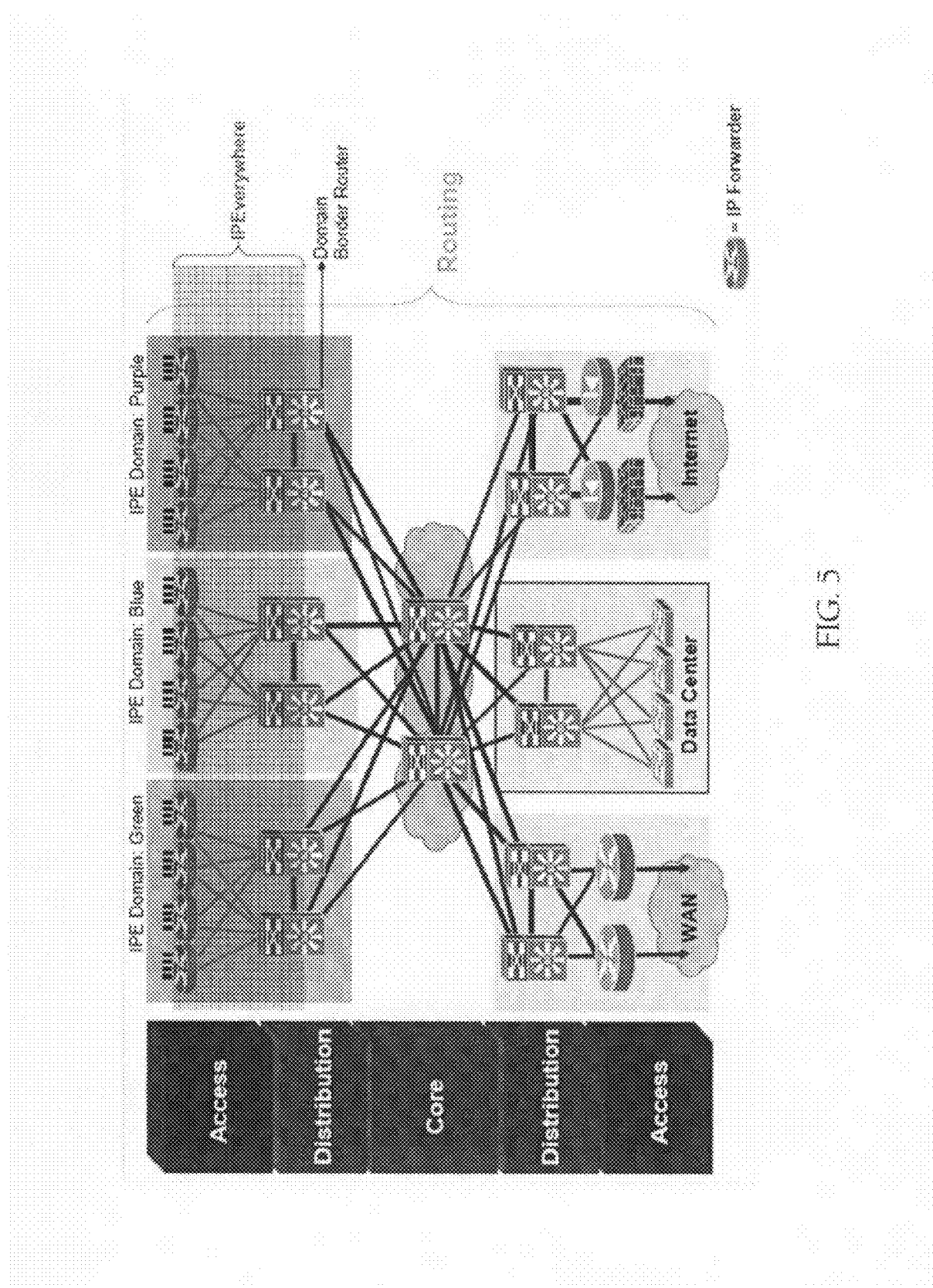
FIG. 5 is a diagram illustrating an example network according to a particular implementation of the invention.

FIG. 5 illustrates an example network including one or more such sub-domains. In the illustrated network, there are three sub domains: Green, Blue and Purple. Each domain runs a common set of protocols and has similar policies. Domains also provide a scalable solution for a large network. The routers that connect a sub-domain to the rest of the network are called domain border routers (DBR). It may be possible that a domain border router is connected to more than one sub-domain. If a domain border router interconnects multiple domains, any interface on that router belongs to one domain. All forwarders, including domain border routers, run a routing protocol to learn the sub-domain topology and also all hosts that are connected to a sub-domain. Domain border routers, however, advertise only subnet addresses of the domain to the rest of the network. This allows the sub-domain to contain all network events such as link up/down within the domain and to advertise only summary information to the network.

The domain discussed above may contain a set of hosts and a set of forwarders. In order to forward the traffic, forwarders maintain path and host association information. Path information relates to the routing paths to each forwarder. IP addresses such as loop back interfaces and/or management interfaces of an IPE forwarder can be propagated using a routing protocol. Host associations indicate to which forwarder a given host is directly connected. For example, host association information may be represented as (H, F), which indicates that host H is directly connected to forwarder F. To forward traffic to host H, the traffic is sent to F. Once the path to F is known, a path to H (or host route) can be computed and installed. This path is same as the path to the forwarder that originated the host association. The path to the forwarder is already available from other routing protocols that propagated forwarder routes. Because the domain consists of only forwarders and hosts, all internal route information in a domain includes forwarder routes and host associations. Domain border routers may advertise a default route or network addresses that are external to the domain.

In particular embodiments of this system, a domain will be a single OSPF AS, with each sub-domain mapping to a single NSSSA (not-so-stubby-sub-area), which is a grouping of routing systems defined by restrictions as to flooded LSAs, as described herein. It will be appreciated that, in this instance, a sub-domain border router will operate as an OSPF area border router (ABR), which would ordinarily entail some network redesign when an enterprise migrates to the system. If a domain consists of multiple sub-domains, the individual NSSA areas will be connected via an OSPF backbone. In an alternative OSPF embodiment, each sub-domain might be run in its own AS and routers connecting sub-domains might run multiple OSPF instances and use mutual redistribution.

A forwarder in this system might use an IGP, such as OSPF, to perform a number of functions, including: (a) advertising the reachability of host routes; (b) maintaining reachability information for the other forwarders in a sub-domain; (c) advertising subnet default routes; and (d) assisting in managing and debugging the sub-domain. In some embodiments, the system's host-discovery code might install interface routes for the individual hosts connected to an interface. The system may use OSPF to redistribute these (e.g., from the access layer) in Type-7 LSAs with Type-2 metric in order to advertise basic reachability within a sub-domain. Such redistribution would not require any, changes to OSPF. However, forwarders serving as domain border routers might also have the ability to summarize and redistribute the system's routes with other routing protocols, including other OSPF instances. Since it would be disadvantageous to translate and advertise the type-7 host routes across area boundaries, OSPF might be enhanced in some embodiments to install these host routes with the NSSA propagate (P) bit set to zero to aid in subsequent filtering, while the subnets and addresses of the forwarders will be advertised in Type-1 LSAs. As explained in IETF RFC 3101, Type-7 LSAs are only flooded within the originating NSSA. The flooding of Type-7 LSAs follows the same rules as the flooding of Type-1 and Type-2 LSAs. NSSA border routers select which Type-7 LSAs are translated into Type-5 LSAs and flooded into the OSPF domain's transit topology. Type-7 LSAs have a propagate (P) bit that, when set, tells an NSSA border router to translate a Type-7 LSA into a Type-5 LSA. If the P-bit is clear the LSA is not translated into a Type-5 LSA by NSSA border routers. (For a general explanation of these terms, see the IETF's RFC 3101.)

Figure 2:
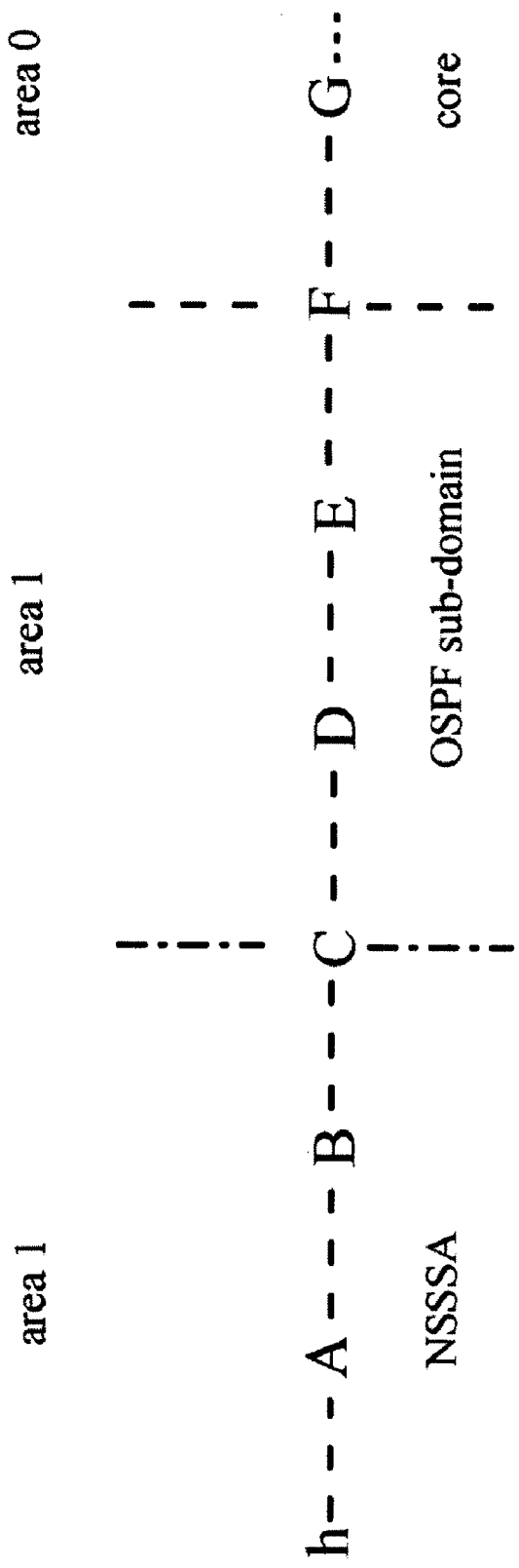
FIG. 2 is a diagram showing a network implementation involving a system with enhanced use of the Internet Protocol (IP), which network implementation might be used with some embodiments of the present invention.

FIG. 2 is a diagram showing a network implementation involving the system just described, which network implementation might be used with some embodiments of the present invention. As shown in the diagram, seven forwarders (or routers) are connected in an internetwork: A, B, C, D, E, F, and G. Also as shown in the diagram, forwarder A is connected to a host, h. Forwarders A and B are in a system sub-domain as described above, which system sub-domain is an NSSSA in area 1. Forwarder C is on the border between the NSSSA and the OSPF sub-domain of area 1 (which is not an NSSSA), where the OSPF sub-domain of area 1 includes two forwarders, D and E. Forwarder F is on the border between area 1 and area 0, where area 0 is the core (both in terms of OSPF and the hierarchical network design model described in Internetworking Design Basics in the Internetwork Design Guide (Cisco Systems, 2006)) and includes a forwarder, G. As shown in FIG. 2, area 0 is not an NSSSA. It will be appreciated that the topology shown in this diagram is inconsistent with the OSPF protocol, since the NSSSA that includes forwarders A and B is not connected to the core, area 0, and therefore the topology might entail some redesign of the internetwork (e.g., by the creation of a virtual link between border forwarders C and F), in the absence of the process described below.

B. Hardware System for Border Router

Figure 3:
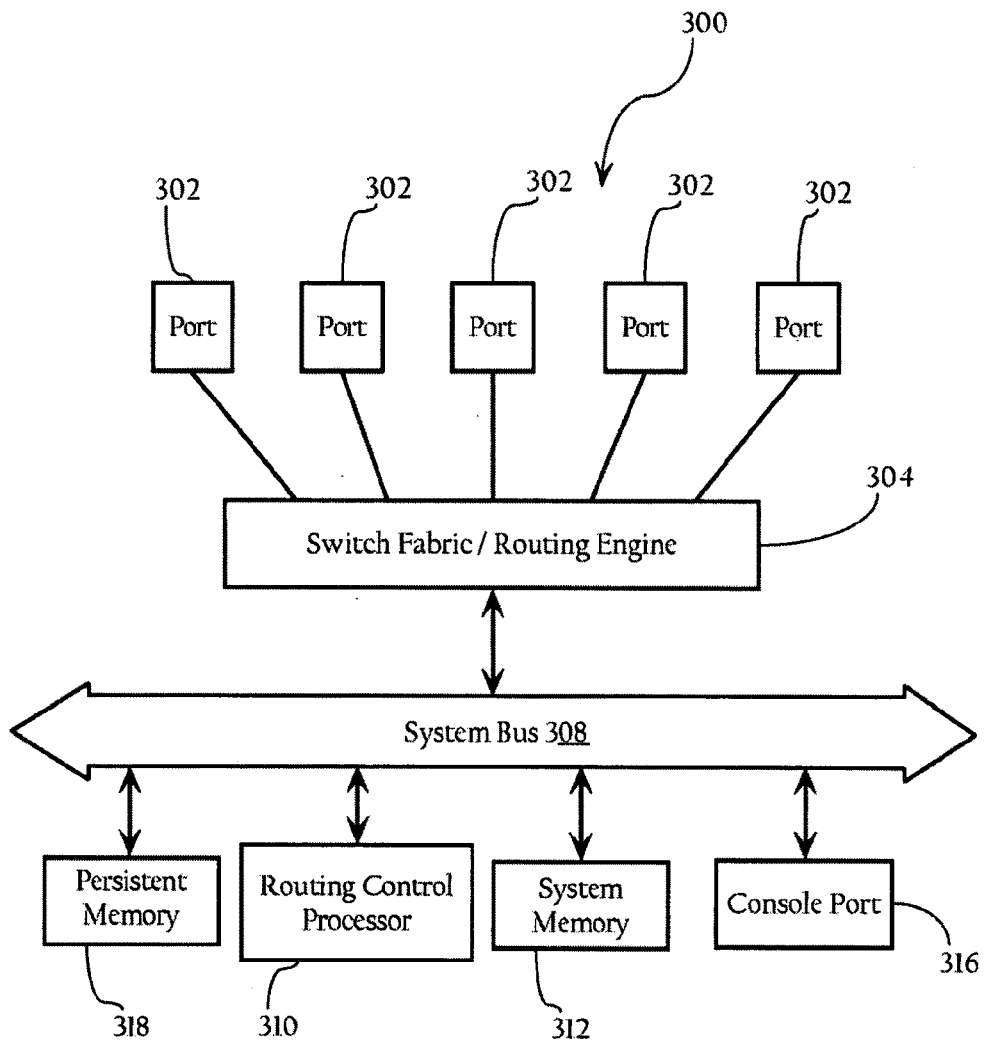
FIG. 3 is a diagram showing the hardware system for a border router or forwarder, which router or forwarder might be used with some embodiments of the present invention.

FIG. 3 is a diagram showing the hardware system for a border router or forwarder (such as C in FIG. 2), which border router or forwarder might be used with some embodiments of the present invention. In one embodiment, the hardware system 300 shown in FIG. 3 includes a routing processor 310, system memory 312, persistent memory 318 (e.g., flash memory or a hard disk drive), a routing engine/switch fabric 304 connected to a plurality of ports 302, a system bus 308 interconnecting these components, and one more software or firmware modules (loadable into system memory 312) directed to network routing functions (e.g., switch fabric and routing table/engine configuration, control message processing, BGP/IGP processing, and the like). It will be appreciated that the process described below might be included in these software or firmware modules, in some embodiments. Also, it will be appreciated that one or more of the ports 302 might be an interface to a router or forwarder of a particular logical type (e.g., a NSSSA forwarder), which type might be used as a basis for selectively filtering LSAs in the process described below. Other functional modules may include discovery modules operative to discover the identity and capabilities of neighboring network devices. In one embodiment, one or more of the ports 302 may be Ethernet interfaces. The system architecture 300 may optionally include a console port 316 allowing for administrative access for purposes such as configuration and diagnostics.

C. Process for Selectively Filtering LSAs

Figure 4:
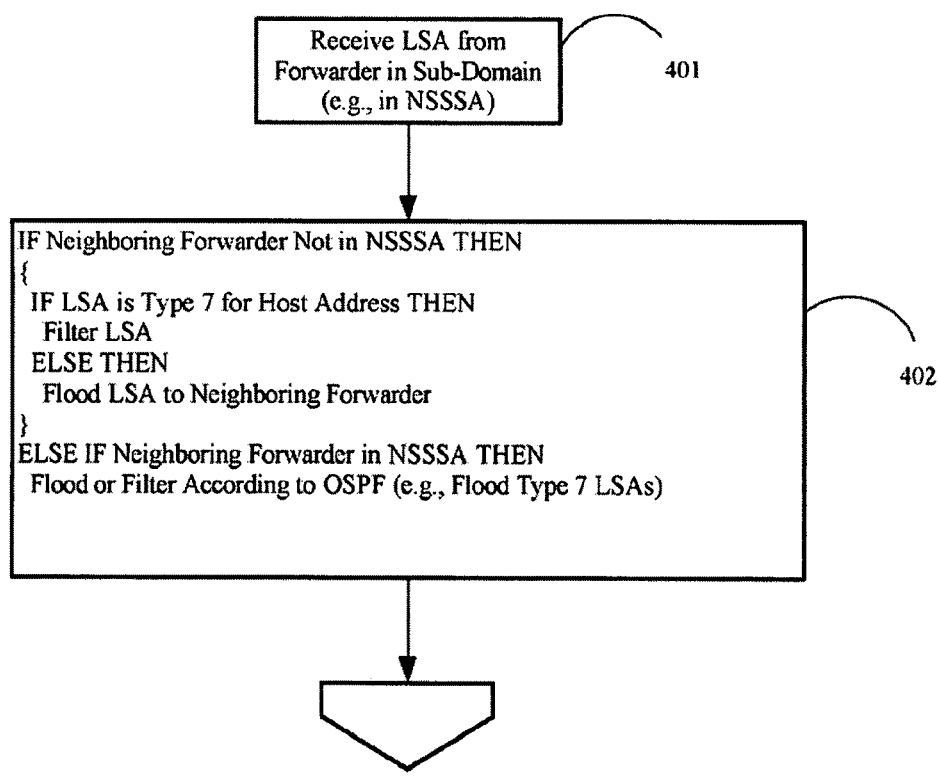
FIG. 4 is a diagram showing a flowchart of a process for selectively filtering LSAs at an NSSSA border router, which process might be used with some embodiments of the present invention.

FIG. 4 is a diagram showing a flowchart of a process for selectively filtering LSAs at an NSSSA border router, which process might be used with some embodiments of the present invention. It will be appreciated that the process described in the flowchart might run on a forwarder (or NSSSA border router) such as node C in FIG. 2, between a forwarder in a system sub-domain or NSSSA (B in FIG. 2) and a forwarder or router which is in an OSPF sub-domain (D in FIG. 2). As shown in FIG. 4, the forwarder receives an LSA on a given interface from another forwarder in the NSSSA, in step 401 of the process. Then in step 402, the process filters or floods the LSA depending on the LSA's type and the forwarder interface under consideration. If the interface is to a neighboring forwarder which is not part of the NSSSA, the process filters the LSA if it is Type 7 (e.g., a host address according to the system) but otherwise floods the LSA. Otherwise, if the interface is to a neighboring forwarder which is part of the NSSSA, the process floods or filters the LSA according to the OSPF protocol, which allows for the flooding of Type 7 LSAs.

The flowchart shown in FIG. 4 is for illustrative purposes and does not show all possible cases, e.g., the case where the LSA is Type 3, 4, or 5 and the interface is to a neighboring forwarder which is not part of the system sub-domain or NSSSA. In such cases, the behavior of the process might depend on the nature of the area to which the neighboring forwarder belongs. Consider again FIG. 2. If the neighboring forwarder is D in area 1 (which is not an NSSSA) and area 1 is a totally stubby area, the process shown in FIG. 4 for C will operate properly if the system sub-domain) is a totally stubby NSSSA. Thus, in some embodiments, re-configuration of the NSSSA is a prerequisite to use of the process shown in FIG. 4.

Particular embodiments of the above-described process might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the process described above and many possible modularizations of those orderings. As a result, the invention is not limited to the specific examples and illustrations discussed above, but only by the following claims and their equivalents.

What is claimed is:

1. A method, comprising:
    advertising, from a first router, network reachability information for one or more hosts in a not-so-stubby-sub-area in one or more subnet level link state advertisements to one or more routing nodes outside the not-so-stubby-sub-area, wherein the first router is a border router of the not-so-stubby-sub-area of a network;
    receiving, at the first router, a link state advertisement which includes a host address, wherein the link state advertisement originated inside the not-so-stubby-sub-area;
    flooding the link state advertisement to a second router, if the second router is inside the not-so-stubby-sub-area; and
    filtering the link state advertisement, if the second router is outside of the not-so-stubby-sub-area.

2. The method according to claim 1, further comprising flooding the link state advertisement to the second router if the link state advertisement does not include a host address and the second router is outside of the not-so-stubby-sub-area.

3. The method according to claim 1, wherein the not-so-stubby-sub-area uses Open Shortest Path First (OSPF) as an interior gateway protocol.

4. The method according to claim 3, wherein the second router is inside an area that uses OSPF as an interior gateway protocol.

5. The method according to claim 1, wherein the link state advertisement is a Type 7 link state advertisement.

6. The method according to claim 5, wherein a propagate bit is clear in the link state advertisement.

7. The method according to claim 1, wherein the first router is a border router between the access layer and distribution layer of a hierarchical network design model.

8. The method according to claim 7, wherein the second router is inside the access layer of the hierarchical network design model if the second router is inside the not-so-stubby-sub-area.

9. The method according to claim 1, wherein the second router is inside the distribution layer of a hierarchical network design model if the second router is outside the not-so-stubby-sub-area.

10. The method according to claim 1, wherein the not-so-stubby-sub-area is a component of a system in which layer 2 switching is replaced by layer 3 routing.

11. An apparatus comprising
one or more network interfaces;
one or more processors;
a memory; and
logic encoded in one or more computer-readable media and comprising instructions operable to cause the one or more processors to:
advertise, in a mode operating as a border router of a not-so-stubby-sub-area of a network, network reachability information for one or more hosts in the not-so-stubby-sub-area in one or more subnet level link state advertisements to one or more routing nodes outside the not-so-stubby-sub-area;
receive a link state advertisement which includes a host address, wherein the link state advertisement originated inside the not-so-stubby-sub-area;
flood the link state advertisement to a second router, if the second router is inside the not-so-stubby-sub-area; and
filter the link state advertisement, if the second router is outside of the not-so-stubby-sub-area.

12. The apparatus of claim 11, further comprising logic to cause the one or more processors to flood the link state advertisement to the second router if the link state advertisement does not include a host address and the second router is outside of the not-so-stubby-sub-area.

13. The apparatus of claim 11, wherein the not-so-stubby-sub-area uses OSPF as its interior gateway protocol.

14. The apparatus of claim 13, wherein the second router is inside an area that uses OSPF as its interior gateway protocol.

15. The apparatus of claim 11, wherein the link state advertisement is a Type 7 link state advertisement.

16. The apparatus of claim 15, wherein the propagate bit is clear in the link state advertisement.

17. The apparatus of claim 11, wherein the second router is inside the access layer of a hierarchical network design model and inside the not-so-stubby-sub-area.

18. The apparatus of claim 11, wherein the second router is inside the distribution layer of the hierarchical network design model and outside the not-so-stubby-sub-area.

19. An apparatus, comprising:
means for advertising, from a first router, network reachability information for one or more hosts in a not-so-stubby-sub-area in one or more subnet level link state advertisements to one or more routing nodes outside the not-so-stubby-sub-area, wherein the first router is a border router of the not-so-stubby-sub-area of a network;
means for receiving, at the first router, a link state advertisement which includes a host address, wherein the link state advertisement originated inside the not-so-stubby-sub-area;
means for flooding the link state advertisement to a second router, if the second router is inside the not-so-stubby-sub-area, and for filtering the link state advertisement, if the second router is outside of the not-so-stubby-sub-area.

20. The apparatus of claim 19 further comprising means for flooding the link state advertisement to the second router if the link state advertisement does not include a host address and the second router is outside of the not-so-stubby-sub-area.

* * * * *